May 14, 1963 W. R. HOWARD 3,089,574
CLUTCH OPERATING MECHANISM
Filed April 4, 1960
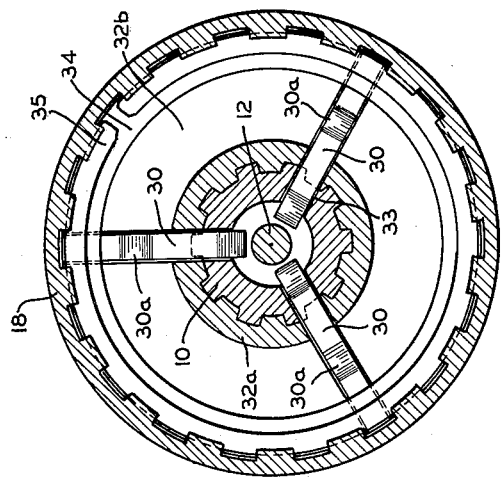
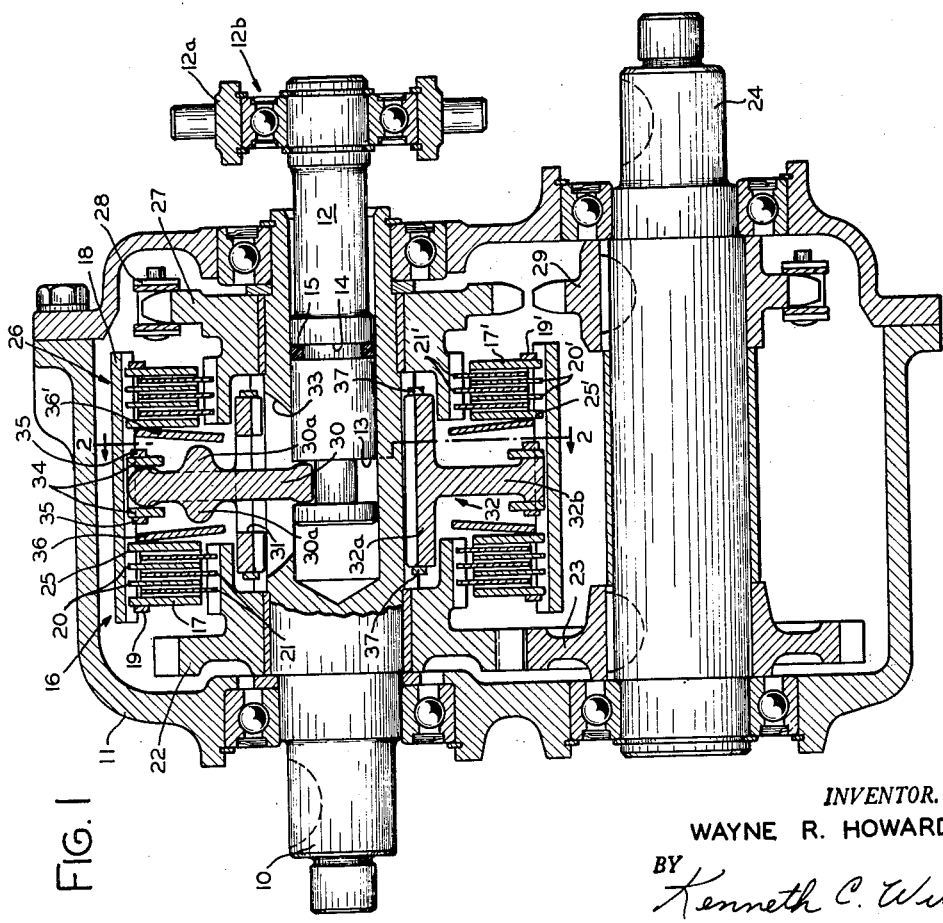
INVENTOR.
WAYNE R. HOWARD
BY
Kenneth C. Witt
ATTORNEY

United States Patent Office 3,089,574
Patented May 14, 1963

3,089,574
CLUTCH OPERATING MECHANISM
Wayne R. Howard, Jackson, Mich., assignor to Clark Equipment Company, a corporation of Michigan
Filed Apr. 4, 1960, Ser. No. 19,767
4 Claims. (Cl. 192—48)

This invention relates to operating mechanisms for clutches and other friction devices, and more particularly to mechanical operating mechanisms, as distinguished from fluid or electrical operating mechanisms, for such devices.

While the invention is described and illustrated herein in a preferred form suitable for the selective operation of a pair of multiple disc clutches, it will be readily appreciated that the invention is not limited to such application.

The object of the invention is to provide such an operating mechanism which is of simple, low-cost construction and is easy to manufacture and assemble, and at the same time is durable and easy to operate.

In carrying out my invention in one preferred form, I provide a mechanism which includes a plurality of levers radially disposed between two clutches. The outer ends of the levers are pivotally mounted on a drum which is common to the two clutches. The inner ends of the levers are attached to a control rod which is telescoped within a drive shaft. The control rod has a neutral position, and as it is moved axially in either direction from this neutral position the levers cause engagement of one clutch or the other.

For a clearer and more complete understanding of my invention, reference should be had to the accompanying drawing in which:

FIGURE 1 is a side elevation in section showing a transmission having a pair of multiple disc clutches and embodying the clutch operating mechanism of my invention.

FIGURE 2 is a section along the line 2—2 in FIGURE 1.

Referring to FIGURE 1 of the drawing, the numeral 10 designates a rotatable driving shaft adapted to be driven by a suitable power source (not shown), and journalled at both ends in a housing 11 by means of ball bearings. The shaft 10 is drilled at one end to receive slidably a control rod 12 which is connected at its projecting end to a shift collar 12a by means of a ball bearing 12b which permits the control rod to rotate within the shift collar. The control rod 12 has an annular groove 13 for receiving the inner ends of levers 30, described hereinafter, and a groove 14 containing an O ring seal 15 to prevent the leakage of lubricant from the transmission.

A drum support member 32 is connected to the shaft 10 for rotation therewith and is secured against axial movement with respect to the shaft. As shown in FIG. 1, the drum support member includes a hub portion 32a which is splined to shaft 10 and secured against axial movement by a pair of snap rings 37. The drum support member also includes a radially extending flange portion 32b which is best seen in FIG. 2 of the drawing. Flange portion 32b and portion 32a have three radially extending slots 31 in which are located three lever members 30, mentioned previously. Each of the levers 30 includes a bulge 30a on one side and a bulge 30b on the other side intermediate the ends for a purpose described in detail hereinafter.

The drum support member 32 carries a longitudinally extending annular drum member 18. Drum 18 is shown as connected to member 30 by means of splines and is retained on member 30 and held against axial movement by retaining rings 34. Rings 34 preferably are splined to facilitate their assembly. Retaining rings 34 in turn are held by snap rings 35. Within drum 18 are located two multiple disc clutch assemblies indicated generally by the numerals 16 and 26.

Clutch assembly 16 connects the driving shaft 10 with a driven shaft 24 through the constantly meshing gears 22, 23. Clutch assembly 16 comprises a backing plate 17 splined to the drum 18 and prevented from axial movement by a snap ring 19, discs 20 splined to the drum 18 interleaved with discs 21 splined to gear 22 rotatably mounted on the drive shaft 10 in a constant mesh with the other gear 23 which is keyed to the driven shaft 24; this shaft is suitably journalled at both ends in the housing 11 by ball bearings as shown. Also included in the clutch assembly 16 is a pressure plate 25 splined to the drum 18 and axially shiftable.

The other clutch assembly 26 connects the drive shaft 10 with the driven shaft 24 through a sprocket and chain arrangement in the transmission described and illustrated herein to show a preferred embodiment of this invention. Such arrangement causes the driven shaft 24 to turn in the opposite direction when clutch 26 is applied from that which prevails when clutch 16 is engaged. Clutch assembly 26 comprises a backing plate 17' splined to the drum 18 and held from axial movement by a snap ring 19', and discs 20' splined to the drum 18 interleaved with discs 21' splined to the sprocket 27 which is rotatably mounted on the drive shaft 10 and connected by a chain 28 to a sprocket 29 keyed to the driven shaft 24.

The levers 30 are located jointly in radial slots 31 in the drum support member 32 as indicated previously and in aligned slots 33 in the driving shaft 10. These levers 30 are pivotably mounted at their outer ends in the drum 18 between the two retainer rings 34 and have their outer ends positioned in groove 13 in the control rod 12. Located between the levers 30 and the pressure plates 25 and 25' respectively of the clutch assemblies 16 and 26 are Belleville (spring) washers 36 and 36' respectively. The projections 30a and 30b respectively engage washers 36 and 36' to compress the disc assemblies and engage selectively clutches 16 and 26 as control rod 12 is moved to the left or right from the neutral position shown in FIG. 1.

I will now describe the operation of my improved clutch operating mechanism. Referring to FIGS. 1 and 2, it will be assumed that the drive shaft 10 is rotating in a counterclockwise direction and the control rod 12 is moved to the left. The movement to the left of the control rod 12, which is accomplished by actuating collar 12a, causes the levers 30 to pivot on the drum 18 so that projections 30a press the spring washer 36 against the pressure plate 25, thereby compressing the clutch pack 16 and causing the drum 18 to be frictionally connected with gear 22. Since gear 22 meshes with gear 23 keyed to the driven shaft 24 the latter shaft will then rotate in a clockwise direction. If the control rod 12 is moved to the right, the other clutch pack 26 is compressed, thus causing the drum 18 to be frictionally connected to sprocket 27 which, since it is connected by chain 28 to sprocket 29 keyed to the driven shaft 24, causes the shaft 24 to rotate in a counterclockwise direction.

While I have herein shown and described the features of my invention in one preferred form, it will be recognized that numerous changes, modifications and substitutions of equivalents may be made therein without departing from the spirit and scope of my invention. For example, while the invention is shown and described herein in a form useful with a pair of clutches, it will be apparent that it could be readily adapted for use with other friction devices such as brakes. As a consequence, it is not my intention to be limited to the particular form of my invention herein shown and described nor otherwise except as set forth in the following appended claims.

I claim:

1. For use in a transmission including a driving shaft having an axially extending opening therein and a driven shaft selectively connectable to the driving shaft by either of a pair of clutch assemblies, a clutch operating mechanism comprising a drum support member connected to the driving shaft, said drum support member having a plurality of radial slots therein, an annular drum connected to said drum support member for supporting a portion of the clutch assemblies radially inwardly of said drum, a plurality of levers pivotally connected to the inner surface of said drum and extending radially inward in said slots, a pair of spring washers located respectively between the clutch assemblies and said levers, a control rod slidably positioned within the axially extending opening in the driving shaft, the driving shaft having a plurality of radially disposed openings through which the said levers extend respectively, and an annular groove in the said control shaft which receives the inner ends of said levers, whereby axial movement of the said control rod provides selective engagement of the clutches.

2. For use in a transmission having a driving shaft with an axially disposed opening therein and a driven shaft selectively connectable to the driving shaft by either of a pair of clutch assemblies, a clutch operating mechanism comprising a drum support member connected to the driving shaft, a radially disposed flange portion on the said drum support member, a drum connected to the outer periphery of the said flange portion of the support member for supporting a portion of the clutch assemblies radially inwardly of said drum, a plurality of levers pivotably connected to said drum and extending radially inward, a plurality of radial slots in the said drum support member having the said levers extending respectively therethrough, an equal number of radial slots in the driving shaft in alignment with the first mentioned slots through which the said levers also extend, a control rod slidably positioned in the axially disposed opening in the driving shaft, and a groove in the said control shaft receiving the inner ends of said levers.

3. A clutch operating mechanism comprising, an annular drum member adaptable for supporting a portion of a clutch radially inwardly of said drum member, a radially disposed drum support member located within the said drum member and connected to the drum for rotation therewith, the said drum support member including a plurality of radially disposed slots, a plurality of levers located respectively in the said slots and pivotally mounted on the said drum member, and an axially extending control rod having means receiving the inner ends of the said levers and arranged for pivoting the said levers upon axial movement of the said control rod for engaging the clutch.

4. In combination, a rotatable elongated annular clutch drum member, a pair of clutch assemblies located within the said drum in spaced apart relation and carried in part by the drum, a radially disposed annular drum support member positioned between the said clutch assemblies and connected to the said drum for rotation therewith, a pair of retaining rings carried by the said drum and abutting the said drum support member on the end surfaces respectively for preventing longitudinal movement of the drum on the drum support member, the said drum support member having a plurality of radially arranged slots, a rotatable shaft located within the said drum support member coaxial therewith and connected for rotating the drum support member, the said shaft having radially disposed slots communicating respectively with the said first mentioned slots in the drum support member, the said shaft also including an axially disposed opening extending into the shaft from one end and the said radial slots in the shaft communicating with said axially disposed opening, a plurality of levers positioned respectively in the said slots in the drum support member and pivotally mounted on the said drum between the said retaining rings to contact the said clutch assemblies upon pivotal movement, the said levers extending through the slots in the said shaft and into the said axially disposed opening in the shaft, an axially extending control rod having an annular groove in which the inner ends of the said levers are received, and means for moving the said control rod axially for selectively engaging the said clutch assemblies, axial movement in one direction causing the said levers to produce engagement of one clutch assembly and axial movement in the other direction causing the levers to produce engagement of the other clutch assembly.

References Cited in the file of this patent

UNITED STATES PATENTS

| | | |
|---|---|---|
| 1,237,849 | Williams | Aug. 21, 1917 |
| 1,887,635 | Gehres et al. | Nov. 15, 1932 |
| 1,998,986 | Foster | Apr. 23, 1935 |
| 2,225,666 | Simmons | Dec. 24, 1940 |
| 2,464,538 | Vanderzee | Mar. 15, 1949 |
| 2,728,431 | Keck | Dec. 27, 1955 |
| 2,856,048 | Carlson | Oct. 14, 1958 |
| 2,908,369 | Frey et al. | Oct. 13, 1959 |